United States Patent [19]
Gaul

[11] 3,709,475
[45] Jan. 9, 1973

[54] PREFOAMER
[75] Inventor: Daniel R. Gaul, Fort Worth, Tex.
[73] Assignee: Crown Molding Co., Dallas, Tex.
[22] Filed: Oct. 22, 1970
[21] Appl. No.: 83,247

Related U.S. Application Data

[60] Division of Ser. No. 856,914, Sept. 8, 1969, abandoned, which is a continuation of Ser. No. 509,973, Nov. 26, 1965, abandoned.

[52] U.S. Cl. ............................................. 263/21 B
[51] Int. Cl. ............................................. F27b 3/22
[58] Field of Search ................. 263/21 B; 264/51, 53

[56] References Cited

UNITED STATES PATENTS

| 3,139,272 | 6/1964 | Couchman | 263/21 B |
| 3,262,686 | 7/1966 | Kraus et al. | 263/21 B |
| 3,378,245 | 4/1968 | Frank | 263/21 B |

Primary Examiner—John J. Camby
Attorney—Francis W. Parker, Jr. et al.

[57] ABSTRACT

This invention is concerned with an apparatus for prefoaming foamable plastic material by relating and controlling the volume and weight of the material so that a specific accurate density material will be produced.

11 Claims, 10 Drawing Figures

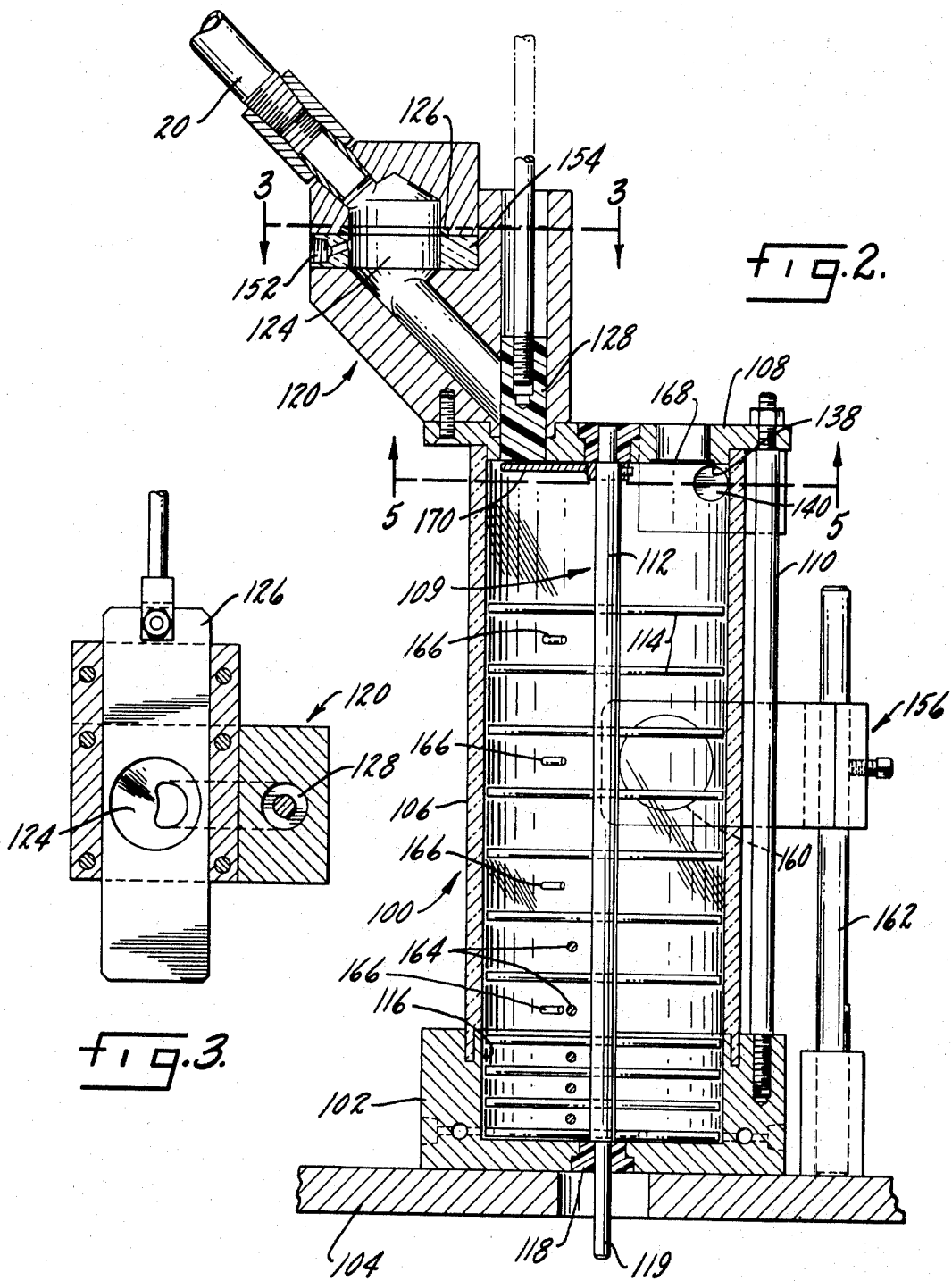

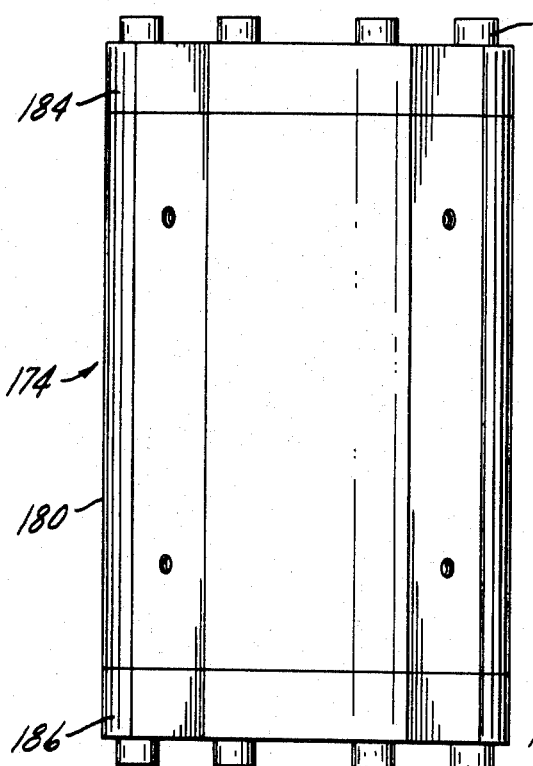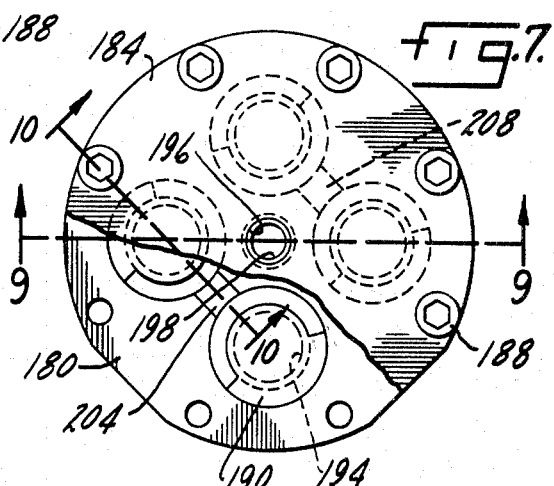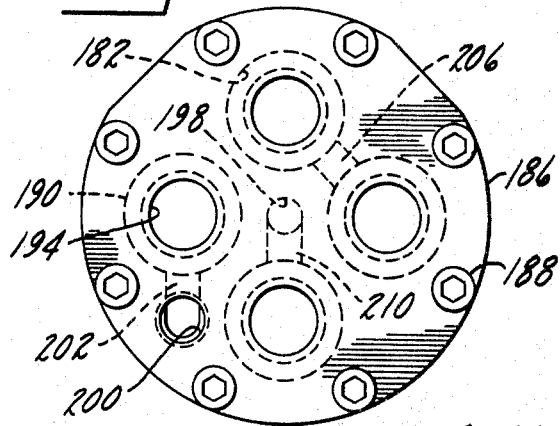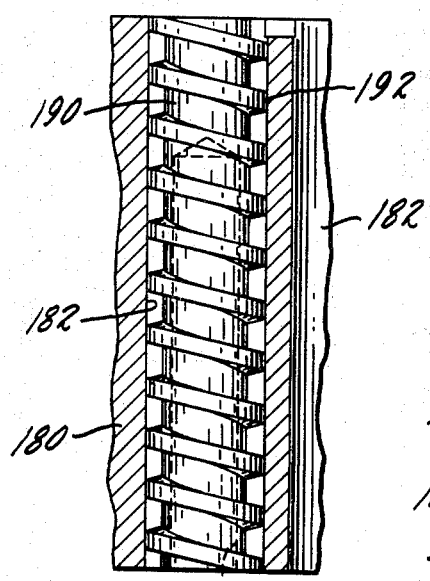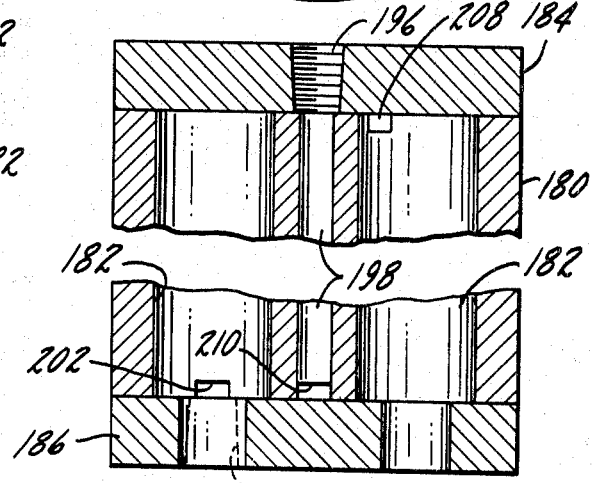

PREFOAMER

This is a division of Ser. No. 856,914, filed Sept. 8, 1969, now abandoned which was a continuation of Ser. No. 509,973, filed Nov. 26, 1965, now abandoned.

This invention is in the field of prefoaming mechanism and methods for partially foaming foamable plastic particles, such as finely divided polystyrene beads containing an impregnated blowing agent, such as butane and the like.

A primary object of the invention is a prefoaming apparatus and method which will supply material of a predetermined, quite accurate density.

Another object is a method and apparatus of the above type which is adjustable.

Another object is a method and apparatus of the above type which solves any static electricity problem.

Another object is a method and apparatus of the above type with a rapid discharge to prevent over-expansion.

Other objects will appear from time to time in the ensuing specification and drawings in which:

BRIEF DESCRIPTION OF THE DRAWINGS

FIG. 2 is a section along line 2—2 of FIG. 1;
FIG. 3 is a section along line 3—3 of FIG. 2;
FIG. 6 is a side view of the heater;
FIG. 7 is a top view thereof;
FIG. 8 is a bottom view thereof;
FIG. 9 is a section along line 9—9 of FIG. 7;
and
FIG. 10 is a section along line 10—10 of FIG. 7.

DESCRIPTION OF THE PREFERRED EMBODIMENT

Figure 1:
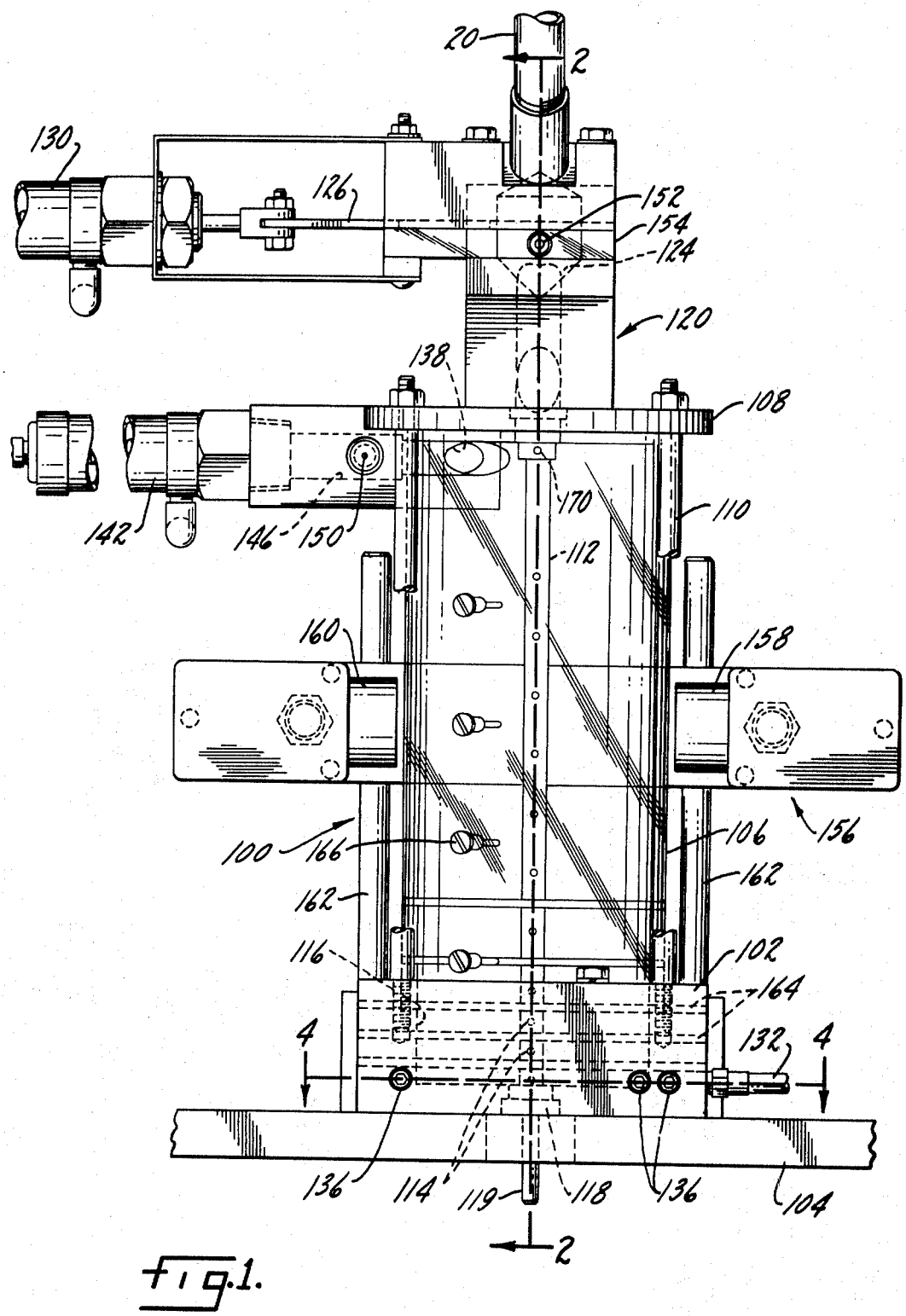
FIG. 1 is a front view of the machine.

A prefoamer is indicated generally at 100 and includes a base 102 mounted on any suitable support 104. The base supports a generally upright chamber or housing 106, shown in this case as cylindrical, with a top plate or cap 108, all three being held together by suitable tie rods 110. The interior of the housing is generally hollow and has an agitator 109 which includes a generally axial, vertically disposed, rotatably mounted center rod 112 with a plurality of vertically spaced, outwardly disposed arms or blades 114. The base 102 is countersunk at 116 thereby providing a socket into which the agitator extends and is supported by and rotatably mounted on a suitable bearing 118 with the lower end 119 of the rod passing through the support 104 to a suitable drive motor, not shown.

A metering device 120, suitably mounted on the top cap 108, is connected to a supply 20. The motoring device contains a chamber 124 which is closed at one end by a suitable valve 126 and at the other end by another valve 128. The volume between valves 126 and 128 is predetermined and may be easily adjusted, for reasons set forth hereinbelow. A spacer or shim of a suitable size may be positioned below shim 154 so that the size of the chamber 124 may be varied without removing the shim 154 and its airpipe connection 152. Such a removable metering spacer may be made of a transparent material, such as phenolic or acrylic, such that the proper movement of the plastic may be observed. These valves may be suitably power operated, by air cylinders or the like, one shown at 130.

Figure 4:
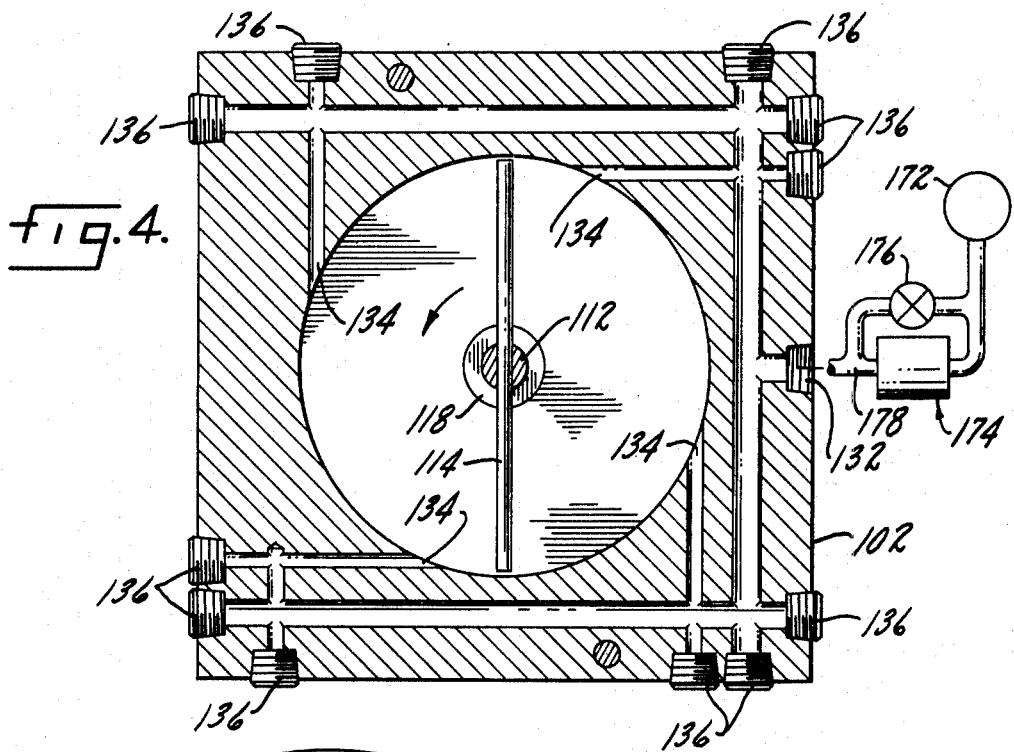
FIG. 4 is a section along line 4—4 of FIG. 1.

The base 102 is suitably cross drilled, in FIG. 4, with a suitable inlet 132 for air with the drill channels resulting in a plurality of tangentially disposed inlets, shown as four, which are arranged to create a cylindrical swirl of material within a chamber. The openings for the cross drillings are suitably plugged, at 136, with the air inlet 132 being connected to a suitable source of air.

Figure 5:
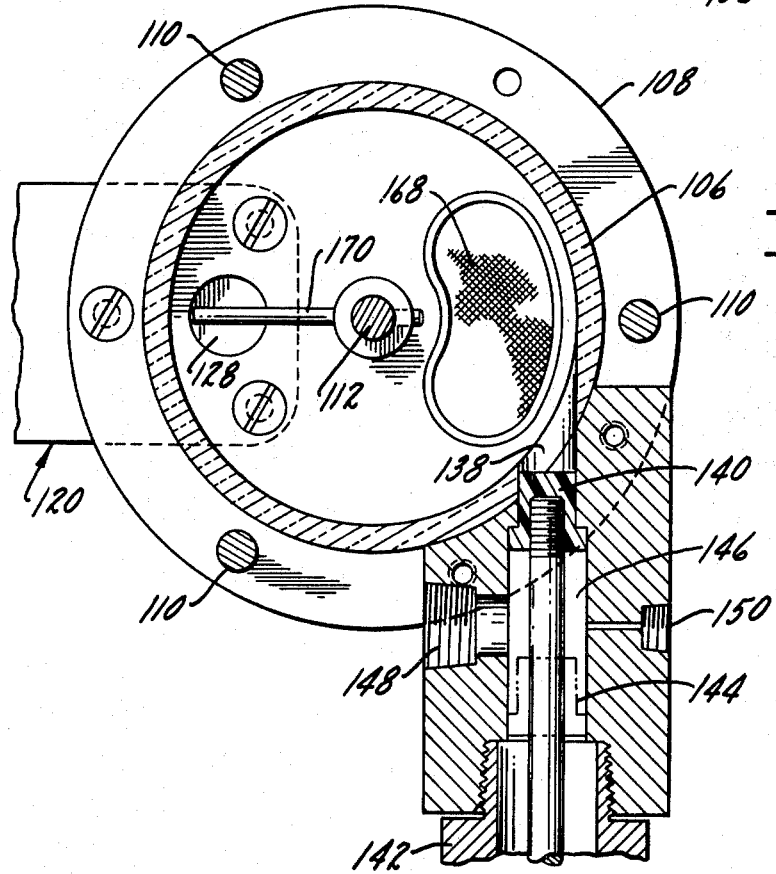
FIG. 5 is a section along line 5—5 of FIG. 2.

A discharge port 138, in FIG. 5, adjacent the top of the chamber, is controlled by a valve 140 which in turn is operated by a suitable power cylinder 142. In its retracted position, as at 144, the valve uncovers a discharge chamber 146 and discharge port 148 which may be connected by any suitable tube or pipe to a source of use. The chamber 146 may be exhausted by an air inlet connection 150 which is directed at the outlet 148 and will create a venturi effect in 146, thereby creating a negative pressure in the discharge port 138. A similar air ejection system 152 may be used in the metering chamber 124. The metering chamber is also provided with a removable and replaceable shim 154 so that the volume of the chamber can be varied.

A sensing arrangement 156 is positioned along the sides of the chamber and includes a light source 158 and photocell or receiver 160, which are mounted adjustably on an upright or post 162. In FIG. 2 the light beam from source 158 passes through the chamber, the walls being transparent, for example glass, to the receiver 160.

A plurality of crossbars 164 extend across the chamber between the blades or arms 114 to break up and prevent lumping and clogging of material. A plurality of probes or electrodes 166, projecting through the glass side wall of the chamber, are positioned at suitable intervals, along the exterior of the chamber. These electrodes may be connected by suitable electric leads, not shown, to a source of energy, and the center rod 112 may also be so connected so that an electrostatic field will be created across the interior of the housing to discharge or prevent an electrostatic charge on the particles. The top cap 108 may be provided with a suitable screen opening 168. A wiper blade 170 may be mounted at the top of the center rod 112 to sweep across the screen 168 and prevent material from clogging it.

A source of pressure air 172, shown schematically in FIG. 4, supplies air to a heater arrangement 174, shown in detail in FIGS. 6 through 10, with a valve controlled bypass 176 so that either low pressure, low velocity, warm air can be supplied through the heater 174 to the inlet connection 132, or high pressure, high velocity air can be supplied through the valved bypass 176 to discharge the material from the prefoam chamber. Suitable check valves may be provided on either or both legs of the T-joint 178 on the discharge side of the heater, to prevent reverse flow up the wrong leg.

The heater 174 includes a body element 180 which is provided with one or more, preferably a plurality, of channels 182 extending from end to end with the end closed by top and bottom caps 184 and 186, held in place by suitable cap screws 188. Each channel contains a labyrinth element 190 which has a helical finned exterior 192, the crest of which snugly engages the surface of the channel so that a helical path is provided. The interior of the labyrinth element is bored at 194 to provide a socket for a heater element.

The top cap 184 has an outlet 196 in the center thereof which communicates with a central channel 198 extending down through the body element. The bottom cap has an inlet 200 which by a cross channel 202, connects to one of the labyrinth elements. The other end of this labyrinth element connects to a second labyrinth element by a cross channel 204. The second labyrinth element communicates with the third such element by a cross channel 206, thereby providing flow from bottom to top. From the top of the third labyrinth element, a cross channel 208 connects to the fourth labyrinth element so that the hot air flows back down, then by cross channel 210 flows to the center bore 198, then out the outlet 196. Each of the labyrinth elements 190 has a center bor 194 for a cartridge heater insert.

Due to the labyrinth arrangement in the heater element 174, the air passing through it will encounter a great deal more resistance and thus will be supplied to the prefoaming chamber at a greatly reduced velocity. But by suitable control on the valve bypass 176, the high pressure air may be supplied directly to the base of the prefoamer, bypassing all of the resistance of the labyrinth units for the discharge step.

The use and operation of the invention are as follows:

The prefoamer involves a chamber with means for supplying a predetermined volume and weight of material to be partially foamed. The metering arrangement 120 traps a predetermined volume 124 of material between the bottom and top valves 126 and 128. The top valve 126 will initially be withdrawn allowing impregnated beads to come down the supply tube 20 until the chamber 124 is filled. Thereafter the valve 126 will be closed. Then the discharge valve 128 will be raised allowing the material to fall into the prefoaming chamber 106. Complete discharge of volume 124 may be insured by an airblast from 152. Thus, an exact amount of material is supplied, on a batch basis, to the prefoaming chamber. This volume of material is quite small and will lie only in the bottom of the chamber. The agitating mechanism is operating and relatively low velocity warm air will be supplied through the manifolding arrangement in the base 102 from connection 132, thereby providing a relatively low velocity heating medium moving up through the chamber discharging through screen vent 168 at the top. The impregnating or expanding agent, for example butane, in the polystyrene beads causes them to swell and the agitating mechanism with the cross breaker bars 164 prevents the beads from sticking together and lumping. When the batch of beads has expanded to a point such that the top of the bead level begins to interrupt light of the sensing mechanism 156, discharge can occur. After a sufficient portion of the light is interrupted, the photocell 160 triggers a discharging arrangement, not shown in detail, which supplies high pressure, high velocity air through the base manifolding. At the same time, valve 140 is withdrawing opening the discharge port 138 and a jet of air from 150 creates a venturi in discharge chamber 146. The combination of the high velocity air coming up from the bottom and the vacuum at the top will cause a rapid and complete discharge. After a suitable discharge, the outlet control valve 140 again closes, the high velocity air is turned off, and the warm prefoaming air comes on again, a new batch of material comes down from the metering device 120 and a new cycle begins. Note that the sensing and triggering arrangement 156 is adjustably mounted so that the light source and photocell can be either raised or lowered. Thus the volume of material below the light beam can be varied and coordinated to the volume and weight of material initially introduced by the metering device 120. The device can provide prefoamed material of a quite accurately controlled density which is extremely important in foam molding.

The device and method involve batch prefoaming foamable plastic beads which have been impregnated with a blowing agent and more particularly involve introducing a metered, quite accurate, measured charge of material — accurate as to volume and weight — and discharging that same weight of material when it reaches a predetermined volume of partial foaming. By the adjustable sensing mechanism 156, which triggers the discharge, and the adjustable shim arrangement for the metering chamber 120, which determines the inlet quantity, the device and method can be made to provide a wide range of densities, depending upon its particular use and intended molding procedure. But for any application, the density of the resultant prefoamed material can be accurately controlled after selection.

While this might be referred to as basically a hot air prefoamer, it should be understood that a certain amount of steam may be introduced into the air current to improve electrostatic conditions and otherwise.

While the preferred form of the invention has been shown and described, suitable additional modifications, changes, substitutions, and alterations may be made without departing from the invention's fundamental theme.

I claim:

1. A prefoamer for partially expanding heat-expansible foam plastic particles, a housing having an interior chamber, means for intermittently introducing a measured quantity of the particles into the chamber on a batch basis, means for passing low velocity warm air through the chamber to intermix with and heat the particles while maintaining all of the particles in the chamber, means for admitting a high pressure, high velocity airstream in the chamber for discharging all of the particles at one time, and means for energizing the high pressure, high velocity airstream when each batch of particles has expanded to the preselected volume.

2. The structure of claim 1 further characterized by and including means for admitting both the low velocity warm air and the high velocity airstream in a swirling pattern at the bottom of the container and for discharging both at the top.

3. The structure of claim 1 further characterized by and including means for maintaining the high velocity airstream at a substantially lower temperature than the low velocity warm air.

4. The structure of claim 2 further characterized by and including means for applying a vacuum at the top of the container when the high velocity airstream is in use to insure complete and rapid discharge of the partially expanded particles.

5. In a prefoamer for partially expanding finely divided foamable plastic particles, such as polystyrene beads impregnated with an expanding agent, a housing having an interior chamber, a metering device for intermittently introducing a certain quantity of the particles into the chamber on a batch basis, an inlet valve controlling the supply of particles to the metering device, an outlet valve controlling the discharge of particles from the metering device to the interior chamber, means for adjusting the volume defined between the inlet and outlet valves for the metering device so that the quantity of particles introduced into the chamber may be varied, means for heating each batch quantity of particles in the chamber to cause the particles to individually expand, means for discharging each batch quantity of particles from the chamber, and means for energizing the discharging means when each batch quantity of particles reaches a preselected volume.

6. The structure of claim 5 further characterized by and including an air jet connected to the metering device to insure complete discharge of the metering volume between the inlet and outlet valves.

7. The structure of claim 5 further characterized in that the means for discharging each batch quantity includes means for admitting a high velocity airstream in a helical pattern at the bottom of the interior chamber, and means for discharging the high velocity airstream at the top of the chamber with the particles entrained therein.

8. In a prefoamer for partically expanding finely divided foamable plastic particles, such as polystyrene beads impregnated with an expanding agent, a housing having an interior chamber, means for intermittently introducing a certain quantity of the particles into the chamber on a batch basis, an air connection to the bottom of the chamber and an outlet generally at the top thereof, an air source for supplying air to the air connection, a heater between the air source and the air connection in the bottom of the chamber so that relatively low velocity warm air may be introduced in the chamber to intermix with and partially expand the particles therein, and a bypass between the air source and the air connection for introducing a high pressure, high velocity airstream into the chamber so as to discharge all particles through the outlet.

9. The structure of claim 8 further characterized by and including means for automatically supplying the high pressure, high velocity airstream from the air source through the bypass to the air connection when each batch quantity of particles reaches a predetermined volume.

10. In a prefoamer for partially expanding heat-expansible foam plastic particles, a housing having an interior chamber, means for intermittently introducing a certain quantity, by weight, of the particles into the chamber on a batch basis, means for heating each batch quantity of particles in the chamber to cause the particles to individually expand, means for discharging each batch quantity of particles from the chamber, and means for energizing the discharging means when the batch quantity of particles reaches a preselected volume, said means being adjustable to vary the volume at which the discharge energizing means is actuated, the chamber being defined by a transparent wall, and means for energizing the discharging means including a light source and a photocell positioned relative to the chamber such that the light beam from the light source passes through the transparent chamber wall and will be energized when the level of the partially foamed particles reaches and interferes with the light beam.

11. The structure of claim 10 further characterized by and including means for adjusting the position of the light source and the photocell so that the volume defined by a particular quantity of particles, at the time of discharge, may be varied.

* * * * *